Feb. 18, 1930. J. V. JANIN 1,747,585
FLYING MACHINE
Filed Sept. 7, 1927 4 Sheets-Sheet 3
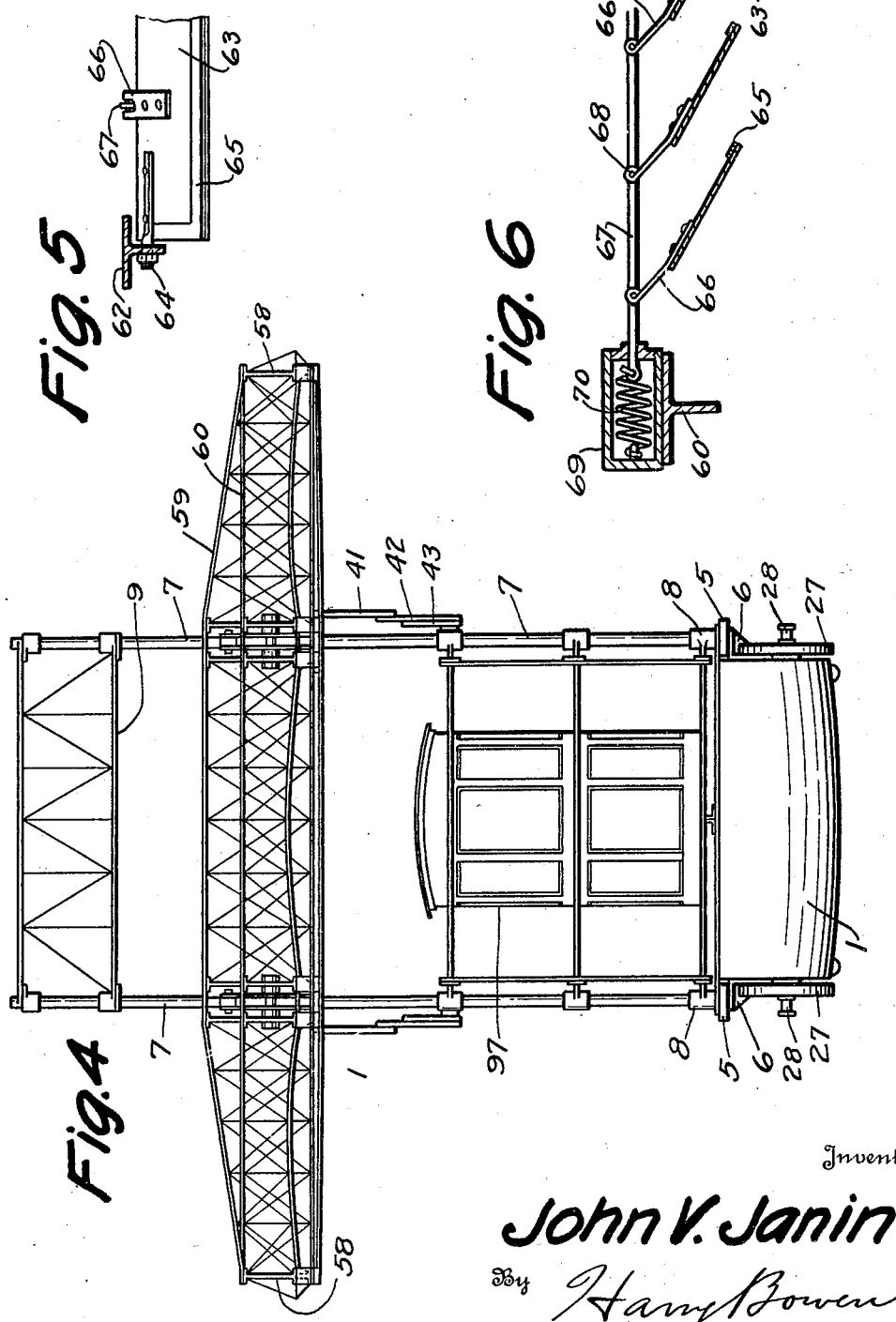
Inventor
John V. Janin
By Harry Bowen
Attorney Feb. 18, 1930.  J. V. JANIN  1,747,585
FLYING MACHINE
Filed Sept. 7, 1927  4 Sheets-Sheet 4
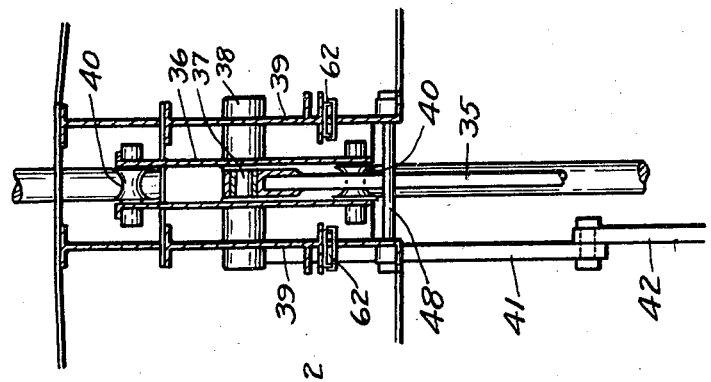
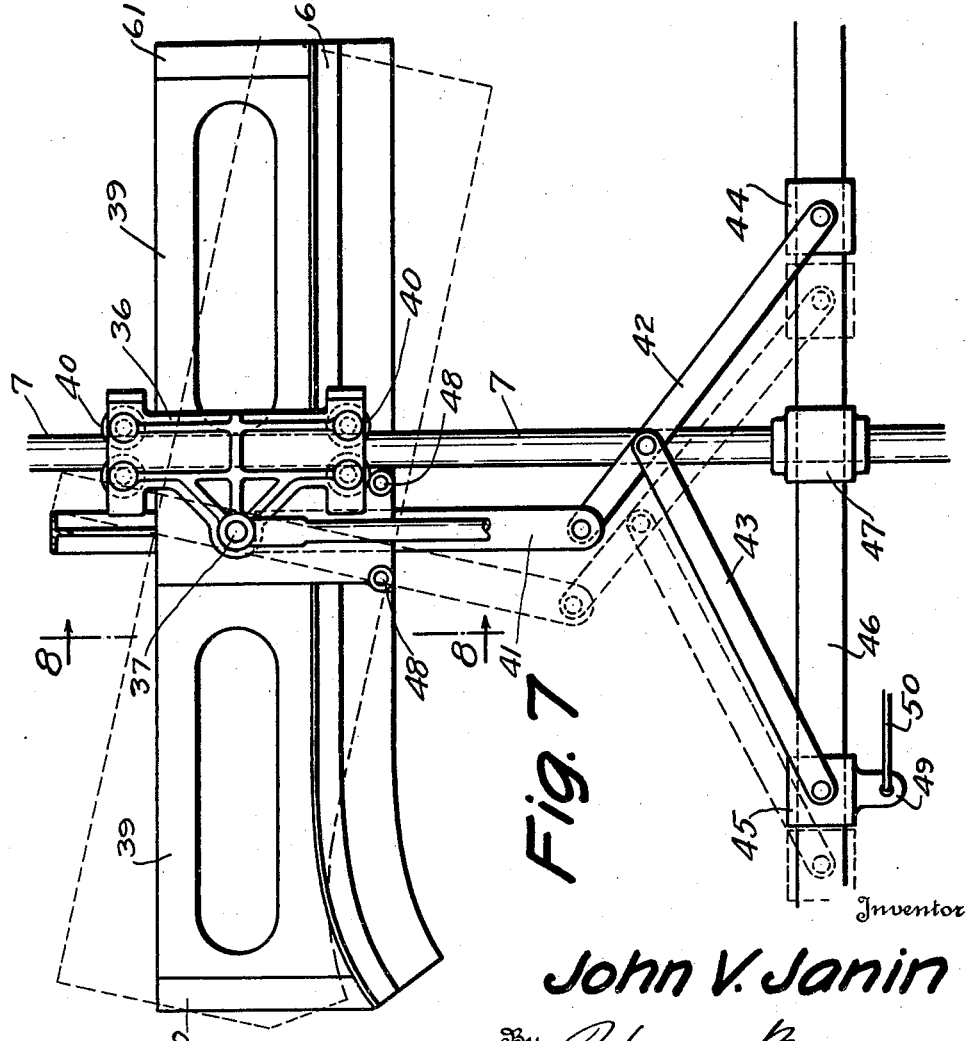
Inventor
John V. Janin
By Harry Bowen
Attorney Patented Feb. 18, 1930

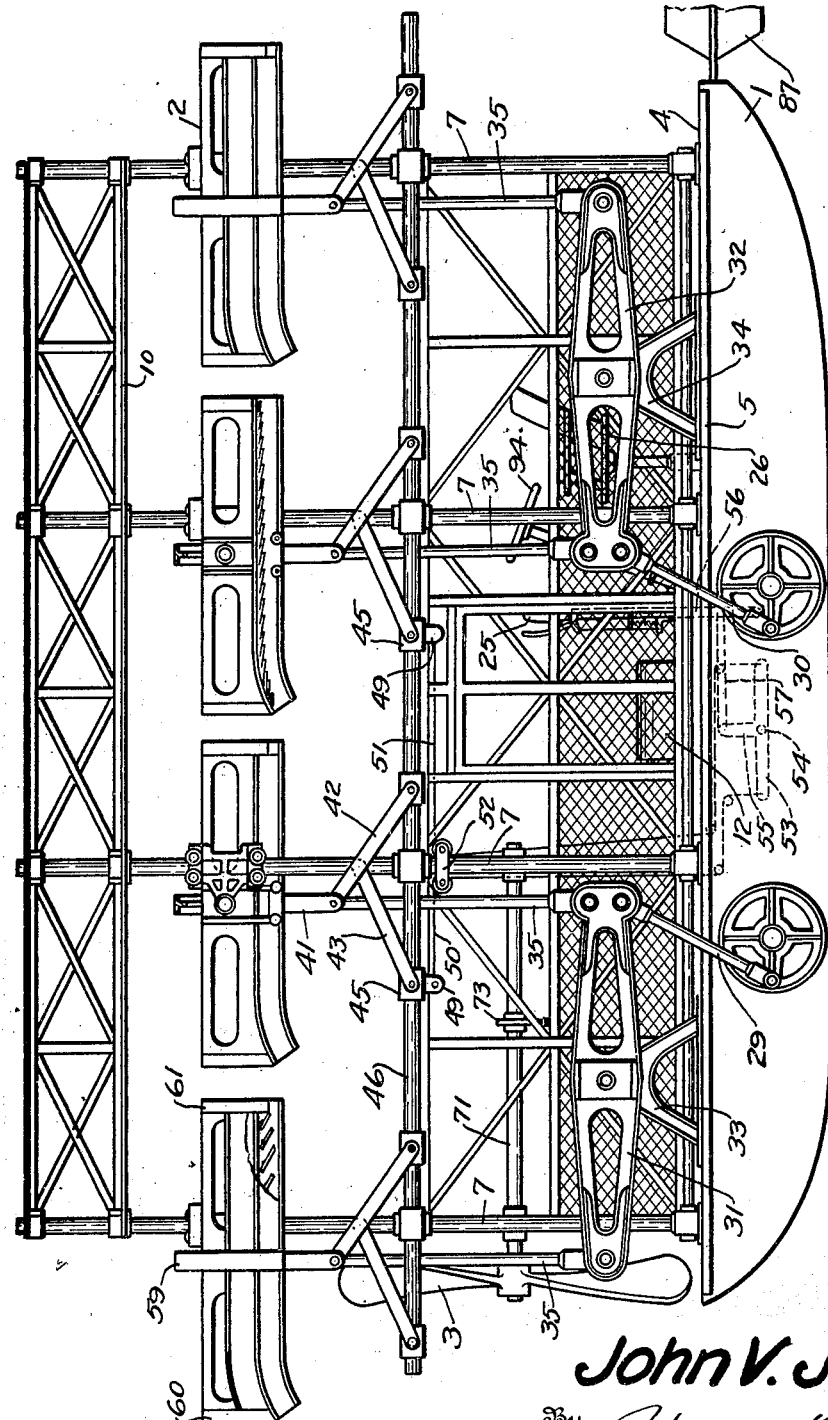

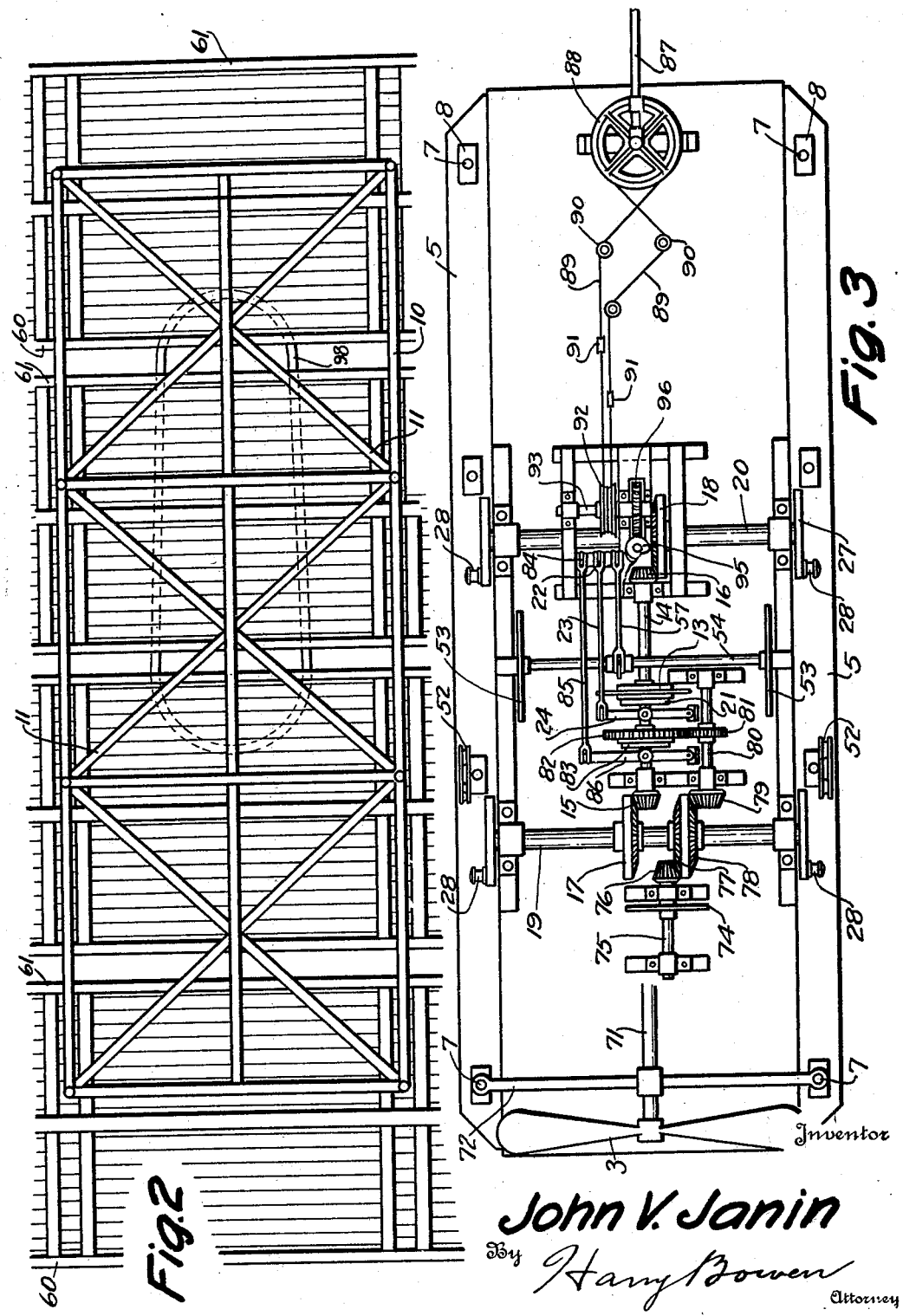

1,747,585

UNITED STATES PATENT OFFICE

JOHN V. JANIN, OF SEATTLE, WASHINGTON

FLYING MACHINE

Application filed September 7, 1927. Serial No. 217,894.

The invention is a flying machine having a plurality of vertically reciprocating wings with automatically operated valves which open as the wings move upward and close as they move downward, which wings may be adjusted to raise or lower the machine vertically or propel it horizontally or at any angle or to hold it stationary in the air.

The object of the invention is to provide a device which will raise vertically, move horizontally or at any angle, remain in the air in a stationary position and which may lower itself vertically.

Another object of the invention is to provide a machine having a plurality of vertically operated wings in which the wings are so designed that they will sustain the device in the air, raise or lower it or convey it horizontally by displacement.

Another object of the invention is to provide means for vertically reciprocating a plurality of wings in alternate pairs.

Another object of the invention is to provide means for shifting the position of the wings so that they may raise the machine vertically or convey it horizontally by the same vertical movement.

Another object of the invention is to provide a suitable structure for supporting a plurality of vertically reciprocating members which will have the least possible weight and support the members rigidly.

A further object of the invention is to provide a machine embodying the combination of a plurality of vertically reciprocating wings and a propeller.

A still further object of the invention is to provide a simple and efficient means for controlling the motion and position of the said wings.

And a still further object of the invention is to provide a flying machine of the type described which is of a simple and economical construction.

With these ends in view the invention embodies a plurality of vertically reciprocating wings having automatically operated valves which open as the wings move upward and close as they move downward, a plurality of vertical standards upon which the wings are pivotally supported, suitable mechanism for vertically reciprocating the wings, other mechanism for controlling the horizontal position of the wings, a propeller that may be used if desired and a rudder.

Other features and advantages of the invention will appear from the following description taken in connection with the drawings, wherein:—

Figure 1 is a side elevation of the machine with parts omitted and other parts broken away.

Figure 2 is a plan view showing the wings and top bracing.

Figure 3 is a sectional plan showing the base and the arrangement of the transmission machinery therein.

Figure 4 is an end elevation.

Figure 5 is a detail showing the hinged connection at the ends of the wing valves.

Figure 6 is a detail showing the spring and the connection thereto for holding the wing valves closed.

Figure 7 is a detail through one of the wings showing the supporting and positioning mechanism.

Figure 8 is an end elevation of the detail shown in Figure 7 on line 8—8 with a part broken away.

In the drawings the device is shown as it would be made wherein numeral 1 indicates the base, numeral 2 the wings, and numeral 3 the propeller.

The base may be of any suitable design and formed of any suitable material. In the design shown it is made with a flat top 4 and a bottom with upwardly curved ends as shown in Figure 1. It is understood however that the bottom may be of any suitable shape. The top is provided with two outwardly extending beams 5 which are held to the base by brackets 6 as shown in Figure 4 and vertical rods upon which the wings are mounted and which are indicated by the numeral 7 are mounted upon the beams 5 in sockets 8. The upper ends of these rods are rigidly tied together by horizontal truss members 9, longitudinal members 10 and diagonal braces as indicated by the numeral 11 so that they may be rigidly held.

The transmission machinery which is mounted on auxiliary means in the base is operated by a motor 12 which may be of any suitable type or design, through a sprocket 13 on a shaft 14 which may be connected to the motor by a chain or any other suitable means. The shaft 14 has bevel gears 15 and 16 at each end which mesh with gears 17 and 18 on shafts 19 and 20. And it will be observed that as the motor rotates the shaft 14 this shaft will in turn rotate the shafts 19 and 20. The sprocket 13 is provided with a clutch 21 which may be operated with a vertical lever 22 through a bar 23 and a clutch lever 24. The lever 22 extends upward to the position indicated by the numeral 25 and shown in Figure 1 so that it may be readily operated from an operator's seat as indicated by the numeral 26. At the ends of the shafts 19 and 20 are discs 27 with eccentric pins 28 on them which are connected by rods 29 and 30 to rocker arms 31 and 32 which are pivotally mounted on stands 33 and 34 on the beams 5. The ends of the rocker arms are attached to the wing structure through connecting rods 35 the upper ends of which are connected to frames 36 by pins 37 and the wing structure is mounted on the pins 37 by hubs 38 of transverse trusses 39 as shown in Figures 7 and 8.

The frames 36 are slidably mounted on the vertical rods 7 and are provided with rollers 40 at each end. It will be observed that as the rocker arms 31 and 32 operate the connecting rods will move the wings upward and downward on the rods 7. The trusses 39 are provided with downwardly extending bars 41 which are rigidly attached to the trusses at their upper ends and connected at their lower ends to levers 42 and 43, the lever 42 being attached to a slidable collar 44 and the lever 43 being attached to a stationary collar 45 both of which collars are mounted on a longitudinal shaft 46 which is slidably attached to the vertical rods 7 through bearings 47. The lower edges of the wing trusses 39 are held by bolts 48 as shown.

The two inner stationary hubs indicated by the numeral 45 are provided with downwardly extending projections 49 to which cords 50 and 51 are attached which extend over pulleys 52 downward into the base and around suitable pulleys to a rocking beam 53 which is pivotally mounted in the base on a pin 54. The beam 53 is provided with a vertical extension 55 which is attached to a hand lever 56 through a bar 57 and the hand lever extends upward to a position indicated by the numeral 25 so that it may be conveniently operated from the seat 26. It will be observed that as the beam 53 is operated by the lever 56 it will draw upon one of the cords 50 or 51 and move the bar 46 longitudinally so that it will tilt the position of the wings and if the bar 46 is moved toward the forward end of the machine as indicated by the dotted lines in Figure 7, the wings will be respectively tilted to the position shown in dotted lines and if the rod is moved in the opposite direction the wings will be tilted in the opposite direction. It will be observed in Figure 3 that the rocking beams 53 and the pulleys 52 are provided on both sides of the machine so that the force will be distributed to both sides.

The wings 2 are formed with transverse trusses 39 as hereinbefore described adjacent to the rods 7 with smaller transverse trusses 58 at the ends which are connected by a central longitudinal truss 59 and end trusses 60 and 61. In each of the inner transverse trusses 39 are T bars 62 to which the wing valves 63 are attached by bolts 64 as shown in Figure 5. The edges of the valve 63 are provided with felt strips 65 to insure a positive seal when the valve members are closed. The valves 63 are also provided with clips 66 that are attached to rods 67 through pins 68 and the rods 67 extend into a casing 69 on the side member of the truss 60 of the wing and are attached to a tension spring 70 which will normally hold the valve in a closed position however it will be observed that as the wings move upward the downward pressure of the air will force the vanes open to the position shown in Figure 6. As soon as this pressure is removed however the spring will return the valves to the closed position so that it will be impossible for air to leak through the wing. Similar valves may also be placed between the trusses 39 as shown in Figure 2. It is understood that these vanes or valves may be made of any suitable design and may be controlled in any suitable manner. It is also understood that the trusses and frame which form the wings may also be made of any suitable design and arranged in any suitable manner.

The propeller 3 is mounted upon a shaft 71 which is supported upon cross bars 72 from the vertical rods 7 and driven by a chain through sprockets 73 and 74. It is understood however that although sprockets are shown the propeller may be driven by a belt or any other suitable means. The sprocket 74 is mounted in the base, upon a shaft 75 as shown in Figure 3 and at one end is a bevel gear 76 which meshes with another bevel gear 77 which is freely mounted on the shaft 19 and the gear 77 is attached to another gear 78 which meshes with a gear 79 on a shaft 80 and the shaft 80 is provided with a gear 81 which meshes with a gear 82 on the main drive shaft 14 so that as these gears are operated they will rotate the propeller.

The gear 82 is provided with a clutch 83 which is operated by a vertical lever 84 through a rod 85 and a clutch lever 86 so that the propeller may remain stationary or may be rotated as desired. The lever 84 extends upward to the position indicated by the numeral 25 and shown in Figure 1 so that it may readily be operated from the seat 26. It will be understood that the propeller may be independently operated or may be operated from the motor 12 by any other suitable means. The propeller may also be of any other suitable design and may be mounted in any suitable manner or positioned at any suitable point on the machine.

The machine is provided with a rudder 87 which is positioned at the rear of the base and mounted upon a wheel 88 which may be operated by a cord 89 passing around pulleys 90 and over pulleys 91 to a drum 92 which is mounted upon a shaft 93 and which may be operated by a steering wheel 94 through worm gears 95 and 96 as shown in Figures 1 and 3. It will be observed that as the steering wheel is turned it will rotate the drum 92 and thereby move the rudder in either direction as may be desired.

The operating levers may be enclosed with a cabin as shown in Figure 4 and indicated by the numeral 97 if desired. The outline of this cabin is indicated by the lines 98 in the plan view shown in Figure 2.

It is understood that other changes may be made in the construction without departing from the spirit of the invention. One of which changes may be in the general design of the machine, another may be in the use of different means for operating the wings, another may be in the use of wings of a different shape, another may be in the use of more propellers than shown, another may be in the use of other means for steering the device, and still another may be in the use of other means for changing the position of the wings for moving the device vertically or horizontally.

The construction will be readily understood from the foregoing description. To use the device it may be assembled as shown, and as the motor is started the main operating clutch 21 may be moved to the operating position so that the various parts will rotate to move the wings upward and downward and it will be observed that as the wings move upward and downward the displacement will raise the machine and after it has raised to the desired elevation the angle of the wings may be changed and then as they continue to operate they will move the machine horizontally. It will also be observed that the propeller may also be used to assist the wings in moving the machine horizontally. It will therefore be observed that the machine may readily be raised and moved through the air either vertically or horizontally or at an angle and when it has arrived at its destination the propeller may be stopped and the angle of the wings again changed so that it may be lowered vertically. The machine may therefore be raised and lowered without requiring considerable space for taking off or landing.

Having thus fully described the invention, what I claim to be new and desire to obtain by Letters Patent, is:—

1. In a machine of the class described, a plurality of horizontal members, pivotally mounted vanes in the said members, said vanes being adaptable to open as the planes move upward and close as they move downward, a plurality of vertical standards upon which the said horizontal members are slidably mounted, means for adjusting the angular position of the said members, rocker arms connected to the said members and adaptable to move them upward or downward alternately, suitable eccentrics for operating the said rocker arms, and means for steering the said machine.

2. In a machine of the class described, a plurality of horizontal members, pivotally mounted vanes in the said members, said vanes being adaptable to open as the planes move upward and close as they move downward, a plurality of vertical standards upon which the said horizontal members are slidably mounted, means for adjusting the angular position of the said members, rocker arms connected to the said members and adaptable to move them upward or downward alternately, suitable eccentrics for operating the said rocker arms, means for steering the said machine, and a propeller positioned in the said machine to co-operate with the said horizontal members for lateral movement.

3. In a machine of the class described, a plurality of vertical standards, a base upon which the said standards are mounted, a truss formation for rigidly holding the upper ends of the said standards, a plurality of wings slidably mounted on the said standards, pivotally mounted vanes in the said wings, said vanes being adaptable to open as the wings move upward and close as they move downward, rocker arms pivotally mounted on the said base, connecting rods connecting the ends of the said rocker arms to the said wings, eccentrics for operating the said rocker arms, a motor for operating the said eccentrics, longitudinally slidable bars connected to the said wings through levers for holding the said wings, means for moving the said longitudinal bars to adjust the angular position of the said wings, a propeller operable by the motor that operates the said eccentrics and a suitable rudder for steering the said machine.

4. In a machine of the class described, a plurality of vertical standards, a base upon which the said standards are mounted, a truss formation for rigidly holding the upper ends of the said standards, a plurality of wings slidably mounted on the said standards, pivotally mounted vanes in the said wings, said vanes being adaptable to open as the wings move upward and close as they move downward, rocker arms pivotally mounted on the said base, connecting rods connecting the ends of the said rocker arms to the said wings, eccentrics for operating the said rocker arms, a motor for operating the said eccentrics, longitudinally slidable bars connected to the said wings through levers for holding the said wings, means for moving the said longitudinal bars to adjust the angular position of the said wings, and a suitable rudder for steering the said machine.

JOHN V. JANIN.